(12) United States Patent
Bell et al.

(10) Patent No.: US 7,394,352 B2
(45) Date of Patent: Jul. 1, 2008

(54) VEHICLE CONTROL NETWORK INTEGRATED THEFT DETERRENT SYSTEM

(75) Inventors: Joseph A. Bell, Markle, IN (US); Robert D. Dannenberg, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 373 days.

(21) Appl. No.: 11/205,387

(22) Filed: Aug. 17, 2005

(65) Prior Publication Data

US 2006/0226961 A1    Oct. 12, 2006

Related U.S. Application Data

(60) Provisional application No. 60/670,046, filed on Apr. 11, 2005.

(51) Int. Cl.
*B60R 25/10* (2006.01)

(52) U.S. Cl. .................................. 340/426.3; 180/287
(58) Field of Classification Search ............. 340/426.3, 340/426.11, 426.12, 576; 307/10.2–10.6; 180/272, 279, 287
See application file for complete search history.

(56) References Cited

U.S. PATENT DOCUMENTS

| 4,689,603 | A | * | 8/1987 | Conigliaro et al. | ......... 307/10.4 |
| 5,821,631 | A | * | 10/1998 | Loraas et al. | ............... 180/287 |
| 6,717,508 | B2 | * | 4/2004 | Sashida | ..................... 307/10.2 |
| 6,909,362 | B2 | * | 6/2005 | Tanaka | ..................... 307/10.4 |

* cited by examiner

*Primary Examiner*—John Tweel, Jr.
(74) *Attorney, Agent, or Firm*—Jeffrey P. Calfa

(57) ABSTRACT

Vehicle theft deterrence is affected by requiring the entry of an enabling code to prevent disablement of vehicle operation. System operational variables may be programmed by operators. The system is substantially integrated with existing vehicle control systems.

10 Claims, 3 Drawing Sheets

VEHICLE CONTROL NETWORK INTEGRATED THEFT DETERRENT SYSTEM

This application claims the benefit of U.S. Provisional patent application No. 60/670,046, filed Apr. 11, 2005.

BACKGROUND OF THE INVENTION

1. Technical Field

The invention relates to theft deterrent systems for commercial vehicles and more particularly to a theft deterrent system integrated with existing vehicle control systems.

2. Description of the Problem

Medium and heavy duty trucks often transport valuable or hazardous cargo. This makes these vehicles targets for thieves. Unfortunately, truck electrical wiring is relatively simple compared to passenger cars. In addition, most medium and heavy duty trucks do not have locking steering columns or transmissions. Not having to defeat such devices reduces the time and effort required of thieves to steal a medium or heavy duty truck. It is a relatively simple matter on many vehicles simply to "slim-jim" the door lock and hot wire the key switch, defeating the basic security procedure of removing the ignition key and locking the vehicle.

After-market devices designed to interrupt the ignition or engine crank circuit are known. These devices may require a hidden switch be depressed or some electrical feature such as headlights or the turn signal be switched on before engine cranking is tried. Experienced thieves and other well informed criminals can normally spot such systems quickly as they are not integral to the truck electrical system. This factor contributes to making the devices easier to defeat. Where such a device malfunctions due to failure of the device or poor installation, it can render the vehicle inoperative and make it difficult for regular service personnel to correct on account of lack of familiarity with the device. Such devices can prevent or delay emergency workers from starting and moving a vehicle, as may be necessary where a vehicle hauling flammable cargo is in the vicinity of open flames.

One example of a third party, after-market device, which provides an add-on circuit module, includes a series of switches into which the driver must type a numeric code before the park brake is released. If this is not done the engine is stopped by opening the ignition switch power feed through a relay. This device includes operational modes that are problematic. For example, the anti-theft code must be reentered every time the park brake is released or the engine is restarted. A flustered driver may be temporarily unable to reenter the code under time pressure.

Any theft deterrent system which simply prevents the engine from cranking should also be capable of maintaining memory through the low voltages associated with engine cranking. This can require an expensive power supply.

SUMMARY OF THE INVENTION

According to the invention there is provided a vehicle theft deterrent system. The vehicle theft deterrent system includes a combination entry system for the entry of enabling codes. A vehicle body computer connected to the combination entry system provides for checking the validity of entered combinations. An engine controller implements an engine torque output control program. A communication link between the vehicle body computer and the engine controller provides for messages sourced exogenous to the engine controller for specifying an engine output torque. An ignition circuit is activated by a key. A disable relay in the ignition circuit, having a control input, may be used to disable the ignition circuit regardless of the position of the key. The vehicle body computer has a control output coupled to the control input of the disable relay for controlling the state of the disable relay. The vehicle body computer is responsive to input of an invalid code for sourcing messages for limiting engine output torque rather than disabling the ignition system, permitting local operation of the vehicle.

In its preferred embodiment, the present theft deterrent system is implemented using a six-pack of switches, a relay, minimal wiring and modification of software executed on a vehicle electrical system control module (ESC)/body computer. The feature provides a means to limit vehicle mobility once the vehicle is started. The feature is usable with both manual and automatic transmissions. If the engine is running, and the park brake is released or the vehicle is moved greater than 3 MPH without the proper anti-theft code entered, the body computer can instruct the engine controller to limit engine output to a fraction of its normal maximum. In order to prevent such derating, the driver is required to enter an anti-theft code each time the vehicle is started or when the park brake is released. The code may be entered at any time once the engine is running. However, if the park brake is released or the vehicle has been started with the park brake NOT set and then driven over 3 MPH, the driver has a specific time to enter the proper anti-theft code. The Anti-theft (enabling) code may be any code between 0000001 and 9999999. All digits of the code are to be entered, even if there are leading zeros. Audible and visual indicators are provided to indicate the status of the code entering sequence and position in the engine shut down sequence.

The engine may be derated and shut down. Engine derating is used as a secondary method in conjunction with the shut down method. To provide shut down capability a normally closed relay is placed in series with the ignition relay that is under control of the ESC through a relay driver in the cab and placed under the control of the electrical system controller. The ESC is readily programmed to issue control instructions to the relay in response to absence or failure of the anti-theft code to conform to the proper code. The instruction may be issued immediately or after a delay. Failure of the instruction is readily determined from signals from the engine controller, in which case, engine output may be restricted as a fall back position.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
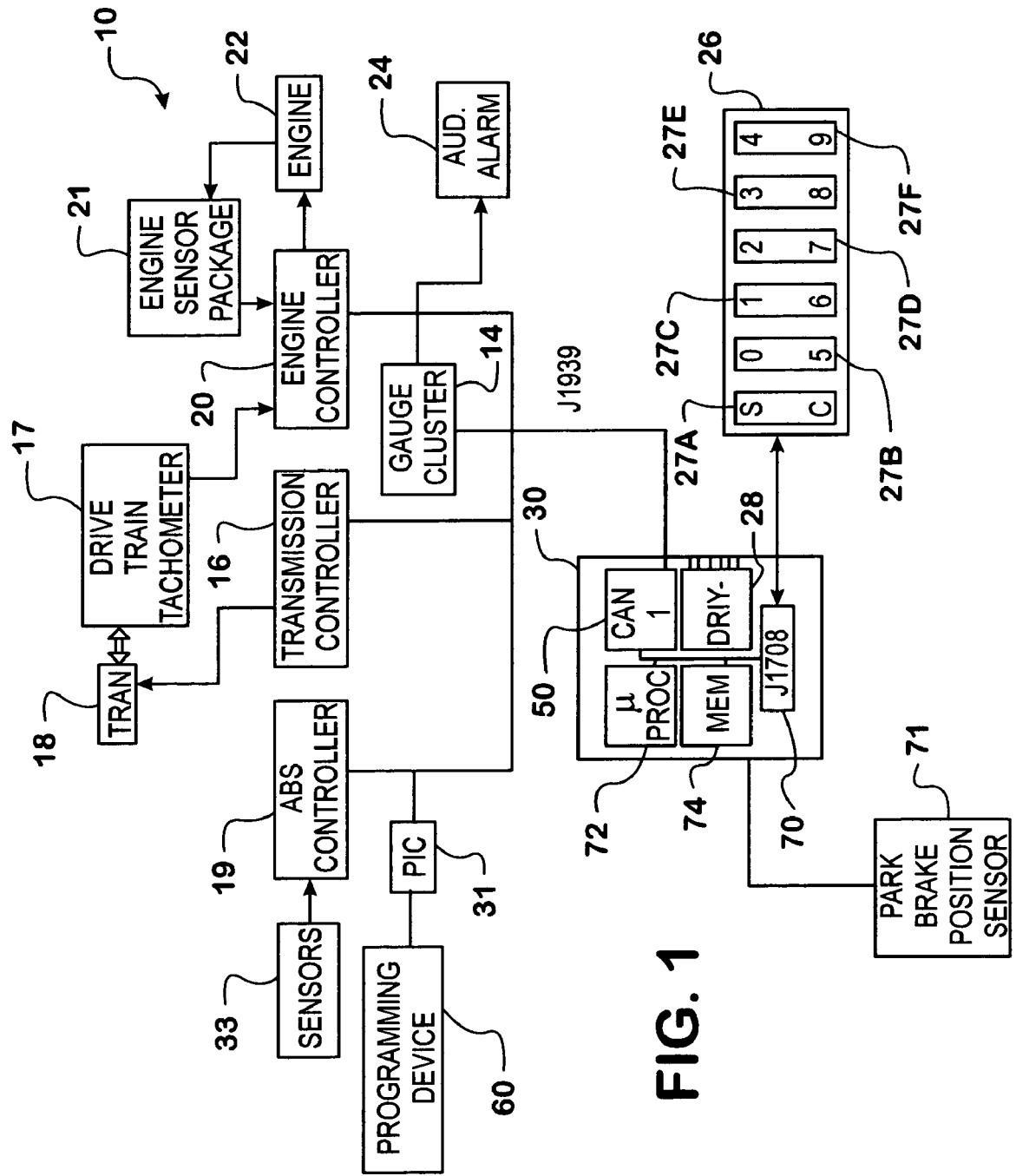
FIG. 1 is a block diagram of a vehicle controller area network control system adapted to implement the anti-theft system of the present invention.

Referring now to the figures and in particular to FIG. 1, a controller area network 10 such as used on a commercial vehicle is set out. Controller area network 10 has as foundational elements a programmable body computer (or Electrical System Controller) 30 based on a microprocessor 72 and memory 74. Memory 74 may in turn include both volatile and non-volatile sections (not shown). Microprocessor 72 communicates with other parts of the programmable body computer 30 over a conventional bus. Among the other parts of the computer are input/output devices for handling network communications including a controller area network (CAN) interface 50 and a SAE J1708 interface 70. The J1708 interface 70 provides for attachment to a six-pack switch bank 26. Body computer 30 provides an array of drivers 28 for the direct control of discrete devices, including, as described below, an energization source for controlling a relay in a vehicle's ignition circuit. The CAN interface 50 and associated network are preferably implemented in accord with the SAE J1939 protocol.

Switch pack 26 is a standard device and provides six rocker switches 27A-F. Rocker switches 27A-F are configured as three position devices, center stable and momentary switch action type (up and down). Five of the switches 27B-F are labeled with the numbers 0 through 9, two digits each to a switch, and disposed in a way as to associate one digit with up action and the remaining digit with down action. A sixth switch 27A may be illuminated under the control of body computer 30 as a status indicator and provides means for clearing codes to be entered using the pack. Codes of between 00000001 and 99999999 are allowed, entered in sequence beginning from the left.

A representative control system is described here, however those skilled in the art will recognize that alternative arrangements are possible. The CAN interface 50 connects to a plurality of system controllers including a gauge cluster 14, an anti-lock brake system controller 19, a transmission controller 16 and an engine controller 20. Any of these controllers may in turn be connected to one or more sensors or packages of sensors associated with the specific controller. The gauge cluster controller 14 controls an auditory alarm 24 used in one embodiment of the invention. ABS controller 19 collects data from wheel rotation sensors 33 which are used to determine skidding. A drive shaft road speed sensor 17 coupled to the output of the transmission 18 has an output connected to an engine controller 20, which is another of the controllers connected to the J1939 compliant bus of the controller area network. A collection of engine sensors is represented by an engine sensor package 21, which is also connected to the engine controller 30. Engine sensor package 21 includes an engine tachometer, an air intake temperature gauge (providing a reasonable reading of ambient temperature), coolant temperature sensors, and engine oil temperature, level and dielectric constant sensors. Engine controller 20 also provides control over fuel injectors which determine the amount of fuel delivered to the engine 22 and the resulting power and torque output of the engine. An off board programming device 60 connected to the J1939 over a programming interface connector 31 can be used to allow an operator to program variables used in implementing the invention. Parameters such as the delay before onset of vehicle operation limitations, the code to be used, etc. can be changed. Vehicle body computer 30 is also connected to a park brake position sensor 71.

Controller area networks are well known in the art and the SAE (Society of Automotive Engineers) J1939 standard is widely employed. The controller area network provides a communication path by which vehicle speed is reported for the ESC body computer 30 to read and over which ESC body computer 30 can issue torque (limiting) requests to be read by the engine controller 20.

Figure 2:
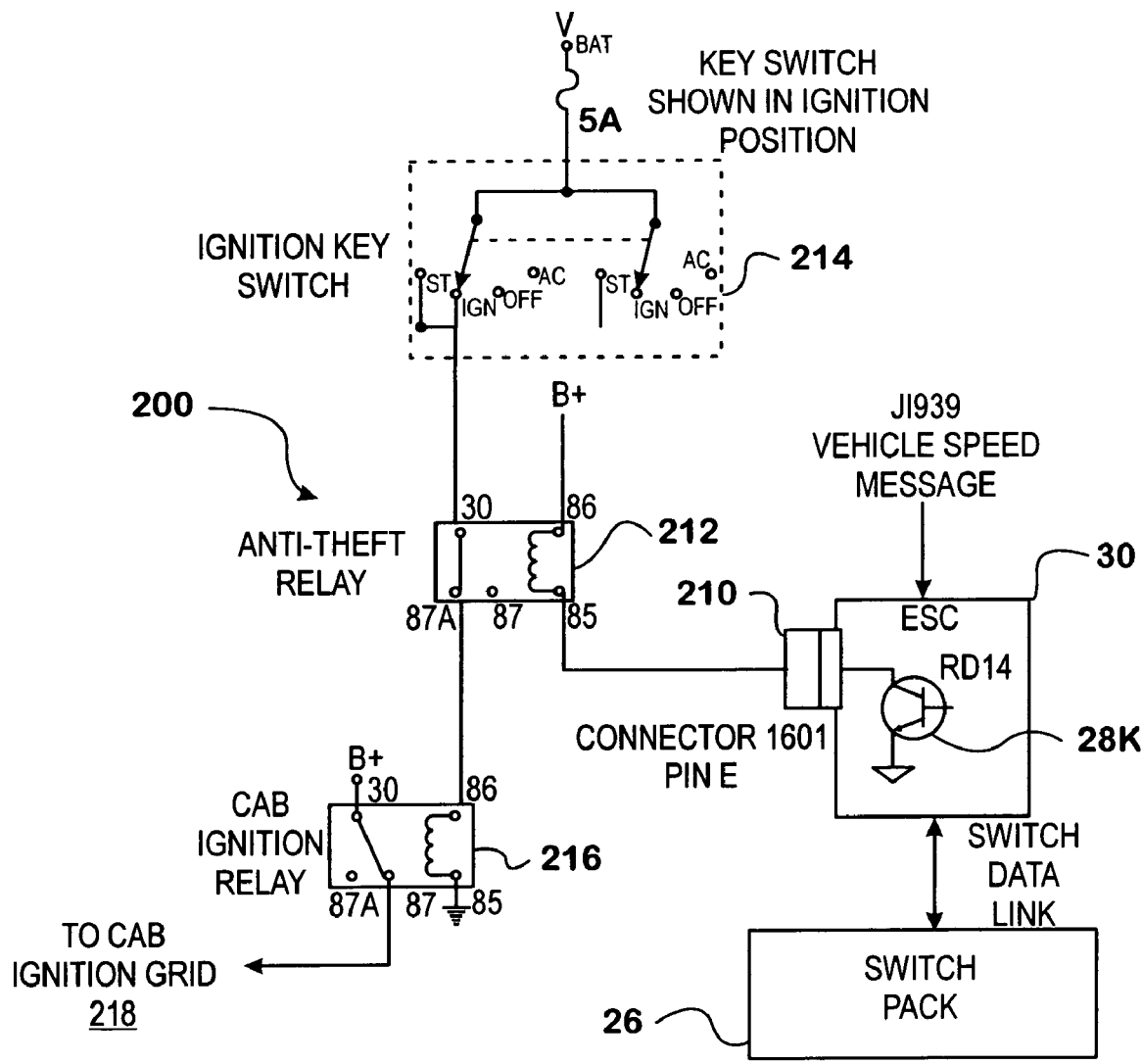
FIG. 2 is a simplified circuit schematic illustrating one aspect of the invention relating to disabling the ignition circuit.

Referring now to FIG. 2, the present invention works by limiting engine torque output, which can be implemented in software, and by disabling the vehicle ignition circuit 200, which is done using an anti-theft relay 212 located between a vehicle ignition key switch 214 and a cab ignition relay 216. Torque limiting is also used to prevent the system from being circumvented by a thief defeating the anti-theft relay 212. Key switch 214 is shown in its ignition position, providing a hot signal to the input pin of relay 212. Relay 212 is shown closed, but opens in response to a signal generated by the ESC 30. The activation signal for opening relay 212 is activate driver transistor 28K of array 28 into conduction bringing connector pin 210 low. With relay 212 open relay 216 is cut off and opens, which interrupts the connection to the remainder of the ignition circuit 218. ESC 30 provides the appropriate control signal on connector pin 210 in response to the vehicle speed messages, the value of the operator input on switch pack 26 and timing by ESC 30. ESC 30 will limit torque and open the ignition relay in unison for a programmable period of time when vehicle conditions indicate the correct code has not been entered.

Figure 3:
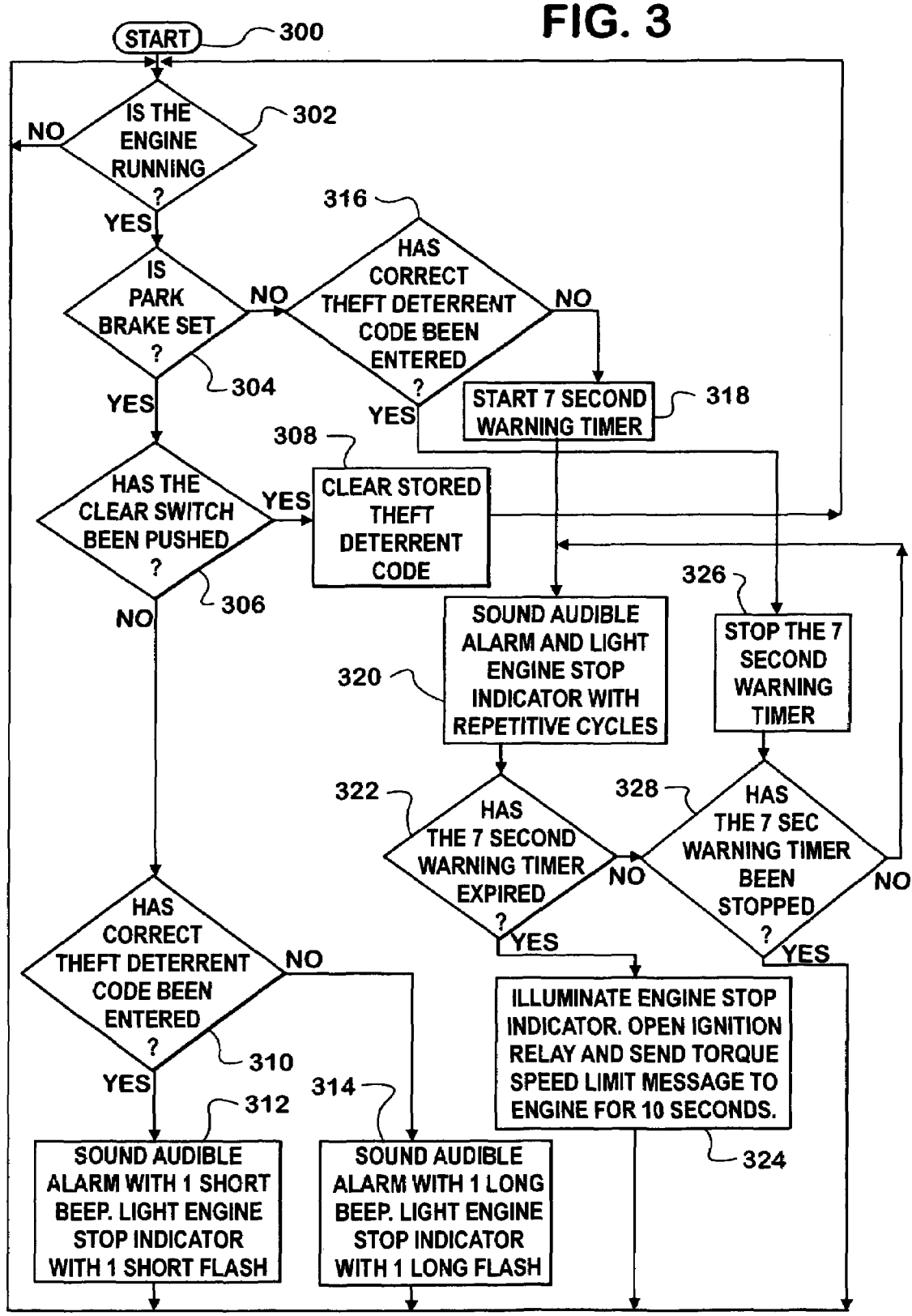
FIG. 3 is a simplified flow chart illustrating operation of the invention.

Referring to FIG. 3, a flow chart is used for describing operation of an embodiment of the invention at a high level. Programmable parameters of the invention are intended to implement the following features: 1) Overall feature ENABLEMENT and DISABLEMENT; 2) Numeric Anti-Theft Code that must be entered by the driver to keep the engine running after the park brake is released and which serves as a means of identifying the operator as someone allowed to operate the vehicle; 3) Programmable time delay that allows the engine to keep running after the park brake is released; 4) Parameter that defines how many digits shall be used as the anti-theft code, i.e. 3, 4, or 5 digit code, etc.; and, 5) Parameter to establish how long the vehicle is kept in the disable mode.

Beginning at step 300 program operation begins with occurrence of a programmable event. Here the event that is required is that the vehicle engine be running (step 302). A negative result from that test places the program in a holding pattern along the NO branch from step 302. Once the engine is running and the YES branch is followed by the program from step 302, it is determined if the park brake has been set (step 304). If the park brake is found to have been set then the YES branch is followed to step 306 where it is determined if the clear switch 27A has been pushed. If it has, then following the YES branch to step 308 clears the operator entered theft deterrent code. Execution then returns to step 302.

Returning to step 306, the handling of entry of the theft deterrent code is considered. The NO branch from step 306 is followed when an operator fails to clear an entry. At step 310 the onboard computer determines if the code entered was correct. If YES, step 312 follows. If NO, then step 314 follows along the NO branch from the decision. Step 312 provides auditory and visual indication to the driver that the correct code has been entered and the program returns to step 302 for detection of release of the parking brake. Along the NO branch from decision step 310 step 314 is reached. Step 314 provides a different, generally more sustained and noticeable, set of visual and auditory indicators to the driver indicating an incorrect number has been entered. However, the vehicle is not disabled immediately and program execution returns to step 302 for detection of park brake release or possible entry of another anti-theft number.

Exit from the anti-theft code entry portion of the loop occurs upon release of the park brake, detected at step 304. Upon determination that the park brake is not set, the program follows the NO branch from step 304 to decision step 316. The anti-theft code which was last entered is compared to the correct number at step 316. If the correct code has been entered, normal operation of the vehicle is permitted. Following the YES branch from step 316 steps 326 and 328 are executed. Step 326 provides for stopping a warning timer (if operating). Next, step 328 verifies that the warning timer is off and returns the program to cycling through the loop by returning the program to step 302 (along the YES branch from step 328).

Entry of the wrong anti-theft code results in some action being taken to fully disable the vehicle after a time delay. Following the NO branch from step 316 leads to step 318 and the start of a seven second warning timer. Following start of the time step 320 is executed to sound an audible alarm and to visually indicate to the driver that the engine will be stopped. The engine STOP light may be cycled to draw attention. Next, time out of the seven second timer is checked at step 322. Upon expiration of the time out period, the YES branch is taken to step 324, which results in the vehicle's ignition relay being opened and issuance of a torque speed limit signal to the engine controller. The dash engine stop indicator light is held on. Before expiration of the time delay program execution follows the NO branch from step 322 to step 328, which operates as discussed above. The vehicle may be moved during the balance of the warning timer period. Following either step 324 or 328, program execution returns to step 302 to monitor for changes in status, including entry of the correct anti-theft code. It may be seen that in order to clear an entry that the park brake must be set for detection at step 304.

While the foregoing flow chart describes an operation resulting in disablement of the engine, other triggers or limitations may be used. For example, instead of a park brake trigger a trigger such as vehicle speed exceeding 3 miles per hour might be used.

The Anti-Theft System may be programmed to include the following: 1) Programmable Parameters which provide a means to modify the performance of the feature; 2) A programmable delay timer which allows the vehicle to be driven out of a dangerous situation without entering an anti-theft code; 3) An audible alarm which provides different warning cadences to indicate different modes of operation; and 4) The anti-theft code which can be programmed for different lengths of strings of characters.

An example of an operational implementation of the invention follows. System operation is initiated upon one of the following. Vehicle is started with the Park Brake Set. Vehicle is started with the Park Brake NOT set and is driven >3 MPH. Vehicle is stalled in an inconvenient location and needs moved.

The Anti-Theft feature is armed under a variety of conditions. This means that the anti-theft code must be entered each time any of these events occur:
1. Ignition key is cycled from OFF to RUN or START.
2. Park Brake is set with the engine running and MPH <3.
3. Driver has depressed the CLEAR switch on the switch pack with the Park Brake set and MPH <3.
4. Driver has entered a bad access code with the park brake set or MPH <3.

The entry procedure for the enabling code requires:
1. The driver should start the engine with the park brake set.
2. The driver shall then enter the anti-theft code that has been pre-programmed into the ESC by depressing the respective numbered switches of the code from left to right. For example, if the code is 54321, the driver should press the switches in a 5 4 3 2 1 order. If the driver makes an error, the CLEAR switch should be depressed and released. Then the code should be entered again.
3. When the correct code has been entered, gauge cluster alarm will quickly beep 1 time and the ENGINE STOP light will blink once in unison with the single short beep. If the driver enters the wrong code, the gauge cluster will sound one long beep and the ENGINE STOP light will illuminate for 1.5 second.

The engine is shut down as follows. The Anti-Theft code must be entered after the engine is running. However, the code must be entered within the time period specified by the Anti_Theft_Time_Delay programmable parameter (Default is 7 seconds) once the park brake is released or else once the vehicle is traveling more than 3 MPH, if the vehicle was started without the park brake being set first.
1. If the driver has failed to enter the anti-theft code and the vehicle is moving or the park has been released, the following alarms will occur for the time duration of the Anti_Theft_Time_Delay parameter.
   Gauge cluster beeper will emit repetitive beeps for Anti_Theft_Delay_Time (7 seconds).
   The Engine Stop indicator in the switch pack will flash slowly.
2. Once the delay period has elapsed, the ignition relay shall be opened for Anti-Theft-Active-Time (10 seconds) to ensure the engine has stopped. Once the engine is stopped, the relay will be released which will allow the restarting of the vehicle. The anti-theft code must be entered to allow normal operation of the vehicle once the vehicle is re-started.

The shut down sequence will also be initiated under the following conditions while a bad or zeroed anti-theft code is entered:
1. Clear switch is pushed while vehicle is stationary and the park brake is released.
2. The park brake is already released when the engine is started.
3. The park brake is released with the engine running.
4. The vehicle is moving.

The Theft Deterrent System is configured using a series of programmable parameters. Vehicles will be delivered from International with the feature turned off. The International Dealer will set each of these parameters using Diamond Logic Builder Program. The definition of each parameter/operating variable is as follows:
1. Theft Deterrent Code:
   The Theft Deterrent Code is the numerical code that the driver must enter each time the vehicle is to be moved.
2. Theft Deterrent Code Length:
   The Theft Deterrent Code length is a number that describes the number of digits in the Theft Deterrent Code. For example if the theft deterrent code is 7351, then the code length is 4. The user has the option to vary the code length using this parameter with a range of 1 to 8 digits.
3. Shut Down Delay Time:
   The shut down delay is the number of seconds that the engine will continue to run once the park brake is released. This allows the driver to move the vehicle from a critical location if the engine was stalled, without re-entering the code. The default is 7 seconds. This number can be changed from any number between 0 and 650 seconds.

4. Theft Deterrent Enable:
   The Theft Deterrent enable parameter allows the user to turn the feature OFF or ON.
5. Shut Down Active Time:
   The Shut Down Active Time is the number of seconds that the ignition relay is open and the torque limit control message is sent to the engine controller. The default is 10 seconds. The number can be changed from 10 to 60 seconds.

The theft deterrent feature provides a means to protect the vehicle from unauthorized usage. The driver is required to enter a code each time the vehicle is started or the PARK BRAKE is set. The code may be entered at any time once the engine is running. If the theft deterrent code is not entered when the PARK BRAKE is released, the driver has a specific time to enter the proper code or else the engine will be stopped. Audible and visual indicators are provided to the driver to indicate the status of the code entering sequence and the engine shut down sequence. The Theft Deterrent feature is useable with both manual and automatic transmissions.

The theft deterrent system of the present invention is well integrated with existing vehicle systems, making maintenance easier. The theft deterrent system provides two mechanisms for limiting vehicle operation, potentially defeating thieves. The present invention provides flexibility in implementation to meet customer specifications, low implementation cost, programmable operating variable settings, safe modes of operation, and all of the components used in the Anti-Theft System are tooled components of the patent holder, therefore, the complete Anti-theft System can be repaired or have programmable parameters modified by any of its dealerships, and switches used in this design match other switches in the vehicle and thus provides superior fit and finish.

While the invention is shown in only a few of its forms, it is not thus limited but is susceptible to various changes and modifications without departing from the spirit and scope of the invention.

What is claimed is:

1. A vehicle theft deterrent system comprising:
   an engine having operating variables;
   a sensor package associated with the engine for measuring the engine operating variables;
   an engine controller for controlling output of the engine and coupled to the sensor package for receiving measurement readings of the engine operating variables;
   an engine ignition system including a key switch relay and a cab ignition relay;
   a combination entry system for the entry of enabling codes;
   a vehicle body computer connected to the combination entry system to receive enabling codes and operable thereon for checking the validity of entered enabling codes;
   an ignition interrupt relay between the key switch relay and the cab ignition relay under the control of the vehicle body computer;
   a communication link coupling the vehicle body computer and the engine controller allowing exchange of data between the engine controller and the engine controller including messages for operation on by the engine controller to limit engine output to prevent normal operation of the vehicle; and
   the vehicle body computer being responsive to entry of an invalid enabling code through the combination entry system for incapacitating the engine.

2. A vehicle theft deterrent system in accord with claim 1, further comprising;
   the vehicle body computer being responsive to the entry of an invalid enabling code for issuing messages over the communication link directing limiting of engine output by the engine controller.

3. A vehicle theft deterrent system in accord with claim 1, further comprising:
   the vehicle body computer being responsive to the entry of an invalid enabling code for opening the ignition interrupt relay.

4. A vehicle theft deterrent system in accord with claim 1, further comprising:
   the data processing system providing for reducing engine output and opening the ignition interrupt relay in response to determination of invalidity of the vehicle operator identification related data.

5. A vehicle theft deterrent system in accord with claim 4, further comprising:
   a park brake position sensor connected to the vehicle body computer, the vehicle body computer being responsive to the park brake position and engine status for initiating an validation of entered enabling codes.

6. A vehicle theft deterrent system in accord with claim 5, further comprising:
   means responsive to direction from the body computer for signaling to an operator validity and invalidity of entered enabling codes, treating absence of entry of an enabling code as an invalid enabling code.

7. A vehicle theft deterrent system in accord with claim 6, wherein the communication link is a controller area network.

8. A vehicle theft deterrent system in accord with claim 7, further comprising:
   vehicle speed sensing meas coupled to the communication link for providing vehicle speed information thereon; and
   the vehicle body computer being further responsive to vehicle speed exceeding a predetermined minimum for triggering monitoring for entry of an enabling code.

9. An engine ignition system control system comprising:
   a key actuated ignition relay system;
   an ignition interrupt relay having a control input and disposed connected to the key actuated ignition relay system for interrupting the output of the key actuated ignition relay system;
   an engine controller for setting engine output;
   a vehicle operator identification system responsive operation of a vehicle system for operation, the vehicle operator identification system providing data related to a vehicle operator's identification;
   a data processing system connected to receive the vehicle operator identification related data, and responsive to receipt thereof for determining validity of the same and connected to the control input of the ignition interrupt relay and to the engine controller;
   the data processing system being responsive to determination of invalidity of the vehicle operator identification related data for selectively crippling operation of the vehicle;
   the data processing system providing for reducing engine output and opening the ignition interrupt relay in response to determination of invalidity of the vehicle operator identification related data; and
   the data processing system being responsive to determination of invalid vehicle operator identification related data, or the absence of any such data, to first direct opening of the ignition interrupt relay and second, responsive to failure of opening of the ignition interrupt relay, to direct reduced output from the engine.

10. An engine ignition system control system comprising:

a key actuated ignition relay system;

an ignition interrupt relay having a control input and disposed connected to the key actuated ignition relay system for interrupting the output of the key actuated ignition relay system;

an engine controller for selling engine output;

a vehicle operator identification system responsive operation of a vehicle system for operation, the vehicle operator identification system providing data related to a vehicle operator's identification;

a data processing system connected to receive the vehicle operator identification related data, and responsive to receipt thereof for determining validity of the same and connected to the control input of the ignition interrupt relay and to the engine controller;

the data processing system bein responsive to determination of invalidity of the vehicle operator identification related data for selectively crippling operation of the vehicle;

the data processing system providing for reducing engine output and opening the ignition interrupt relay in response to determination of invalidity of the vehicle operator identification related data; and the data processing system being responsive to release of a parking brake or operation of the vehicle at a minimum predetermined speed for triggering requirement of acquiring vehicle operator identification data.

* * * * *